United States Patent [19]
Courant et al.

[11] B 4,008,733
[45] Feb. 22, 1977

[54] FILLING VALVES FOR PRESSURE FUELING DEVICES

[75] Inventors: Jacques Courant, Epinay-sur-Seine; Robert Gonnet, Unieux; Marc Thore, Buc, all of France

[73] Assignee: Zenith Aviation, France

[22] Filed: Mar. 26, 1974

[21] Appl. No.: 454,833

[44] Published under the second Trial Voluntary Protest Program on March 30, 1976 as document No. B 454,833.

[30] Foreign Application Priority Data

Apr. 17, 1973 France .......................... 73.13879

[52] U.S. Cl. .................... 137/220; 137/222; 137/486; 137/489; 137/492.5
[51] Int. Cl.² ................ F16K 21/00; F16K 31/42
[58] Field of Search .......... 137/219, 220, 221, 222, 137/486, 489, 492, 492.5

[56] References Cited

UNITED STATES PATENTS

| | | | |
|---|---|---|---|
| 2,608,985 | 9/1952 | Arthur | 137/222 UX |
| 3,119,405 | 1/1964 | Guy | 137/222 X |
| 3,540,462 | 11/1970 | Renzi | 137/219 |
| 3,545,483 | 12/1970 | Valdenazzi | 137/220 UX |

*Primary Examiner*—Alan Cohan
*Assistant Examiner*—Gerald A. Michalsky
*Attorney, Agent, or Firm*—Stevens, Davis, Miller & Mosher

[57] ABSTRACT

A filling valve for a pressure fueling device, particularly for aircraft refueling, comprises a movable sleeve responsive to the flow rate of fuel through the valve and which increases the ratio between the fuel pressures acting on first and second surfaces of the valve closure unit, respectively, and exerting valve closure and opening forces, respectively, in proportion as the rate of flow increases.

4 Claims, 3 Drawing Figures

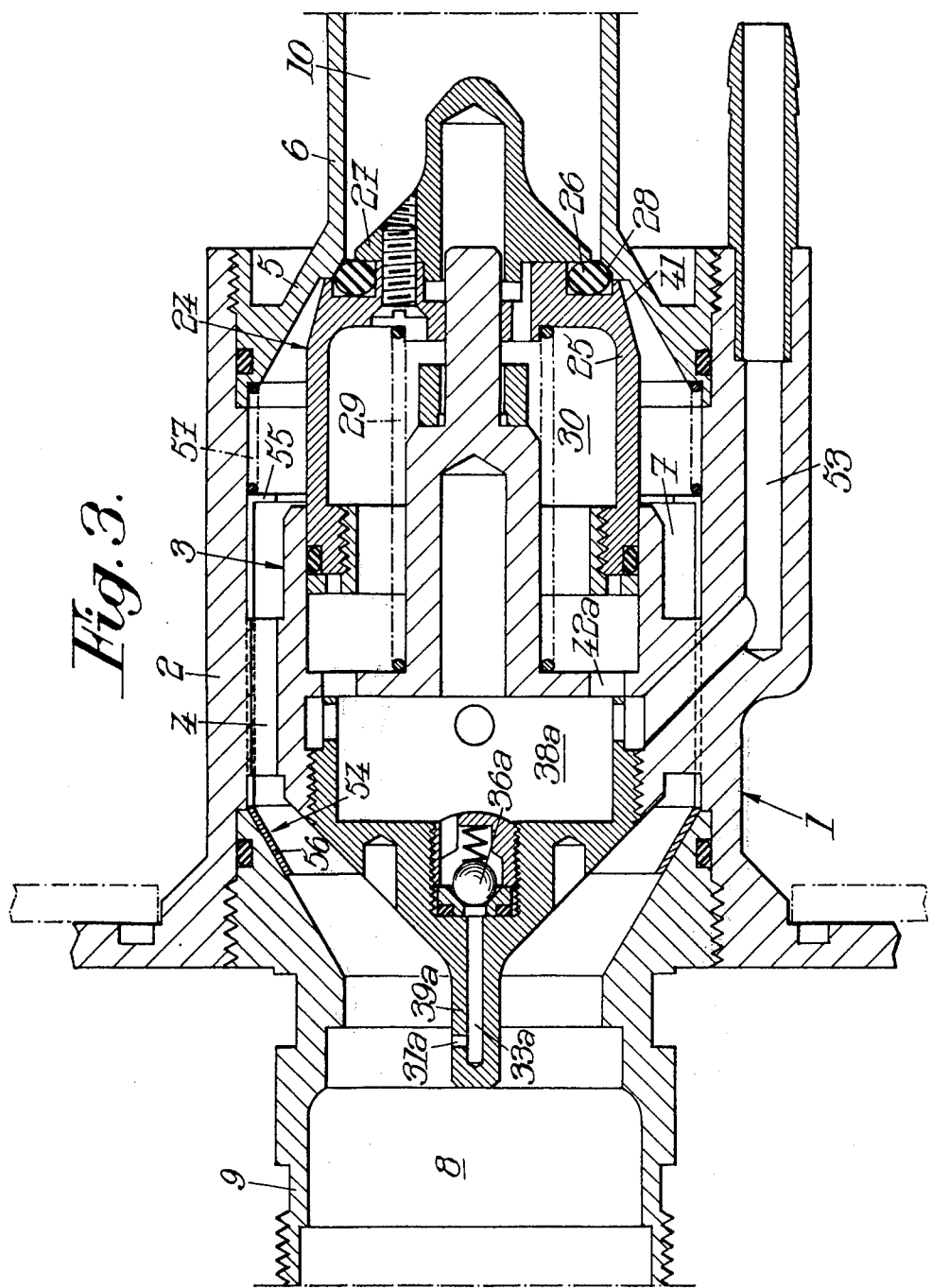

FILLING VALVES FOR PRESSURE FUELING DEVICES

BACKGROUND AND SUMMARY OF THE INVENTION

The invention relates to filling valves for pressure refueling devices of the kind comprising a hollow body having an annular passage between upstream connection means and downstream connection means; the passage having a seat co-operating with a movable closure unit, wherein the body is provided with axially guiding means for the closure unit which are substantially fuel-tight so that the unit limits two chambers, i.e. an outer chamber forming part of the annular passage and an inner chamber permanently communicating with the upstream connection means and adapted to be connected by control means to a discharge or exhaust duct. The invention more particularly relates to such valves in which the pressure of the fuel acting on the wall of the closure unit limiting the outer chamber tends to open the shut-off means (i.e. to move it away from its seat), whereas the pressure of the fuel acting on the wall of the shut-off means limiting the inner chamber (which pressure possibly is supplemented by the action of resilient return means) tends to close the closure unit, and the resulting force exerted in the opening direction is greater or less than the force exerted in the closing direction depending on whether the exhaust duct is freed or not by the control means.

Filling valves of the aforementioned kind are used for filling fuel tanks in general, more particularly vehicle and typically aircraft tanks.

As is known modern aircraft, more particularly jet planes and especially planes having a high capacity, represent an extremely large investment by the air companies using them. In order to pay off them as economically as possible, the companies have to operate with high working ratios necessitating very short dead times at stop-overs, i.e. refueling at very high flow rates, which can be done only by using pressure filling circuits.

Such circuits usually comprise one or more fuel intakes for removably receiving to the inlet pipes for providing fuel under pressure and piping for distributing the fuel between the various aircraft tanks, and are provided with suitable accessories such as taps and valves. Furthermore, each tank or group of tanks comprises a filling valve of the aforementioned kind. The control means can be actuated by any suitable signals, usually electric or hydraulic signals, which are emitted either manually or automatically by a suitable device such as an electric contact level, a float needle or the like. The filling valves are intended to stop the filling operation when the tank is full and also to protect it against transient excess pressure (water-hammer effect) or permanent excess pressure due to the faulty action of the fuel-distributing devices on the ground.

Usually the filling valve is closed if there is no pressure in the upstream connection or if there is a pressure but the control means are out of action. In order to open the valve, the pressure in the inner chamber is reduced to the value of the downstream pressure or to a value intermediate between the upstream and downstream pressures, by opening the exhaust duct. As soon as the required level has been reached in the tank, the exhaust duct is again closed, thus restoring the initial pressure in the inner chamber which, in conjunction with resilient return means if required, closes the filling valve.

Existing filling valves have the drawback that they provide very little or no protection to the tanks against excess pressures. If, therefore, the upstream pressure permanently increases, the flow rate through the valve increases and the vents from the tank to atmosphere may become insufficient, thus producing dangerous excess pressures in the tank.

It is an object of the invention to provide fueling valves which protect the tanks to which they are connected against excess pressures.

A valve according to the invention comprises means responsive to the flow rate of fuel through it and which are adapted to increase the ratio between the fuel pressure in the inner chamber and the fuel pressure in the outer chamber in proportion as the flow rate increases. The means responding to the flow rate may comprise a movable sleeve guided in the body parallel to the flow direction of fuel in the body, the means being provided with a driving surface disposed transversely with respect to the fuel flow direction and acted upon by resilient means in the direction opposite to the flow direction.

In a first embodiment, the means responding to the flow are actuated so as to increase the fuel pressure in the inner chamber in proportion as the flow rate increases. If the means comprise the aforementioned movable sleeve, the sleeve can be actuated so as to increase the cross-section through which the upstream connection communicates with the inner chamber or to decrease the cross-section through which the inner chamber communicates with the downstream connection, in proportion as the flow rate increases.

According to a second embodiment, the means responding to the flow rate are actuated so as to decrease the fuel pressure in the outer chamber in proportion as the flow rate increases. If the aforementioned means comprise the aforementioned sleeve, the sleeve can be actuated so as to produce a pressure drop which increases with the flow rate in the annular passage.

The invention will be more clearly understood from the following description and accompanying drawings, both of which relate to preferred embodiments.

SHORT DESCRIPTION OF THE DRAWINGS

FIG. 3 shows a modified embodiment of the filling valve in axial section.

DESCRIPTION OF PREFERRED EMBODIMENTS

Figure 1:
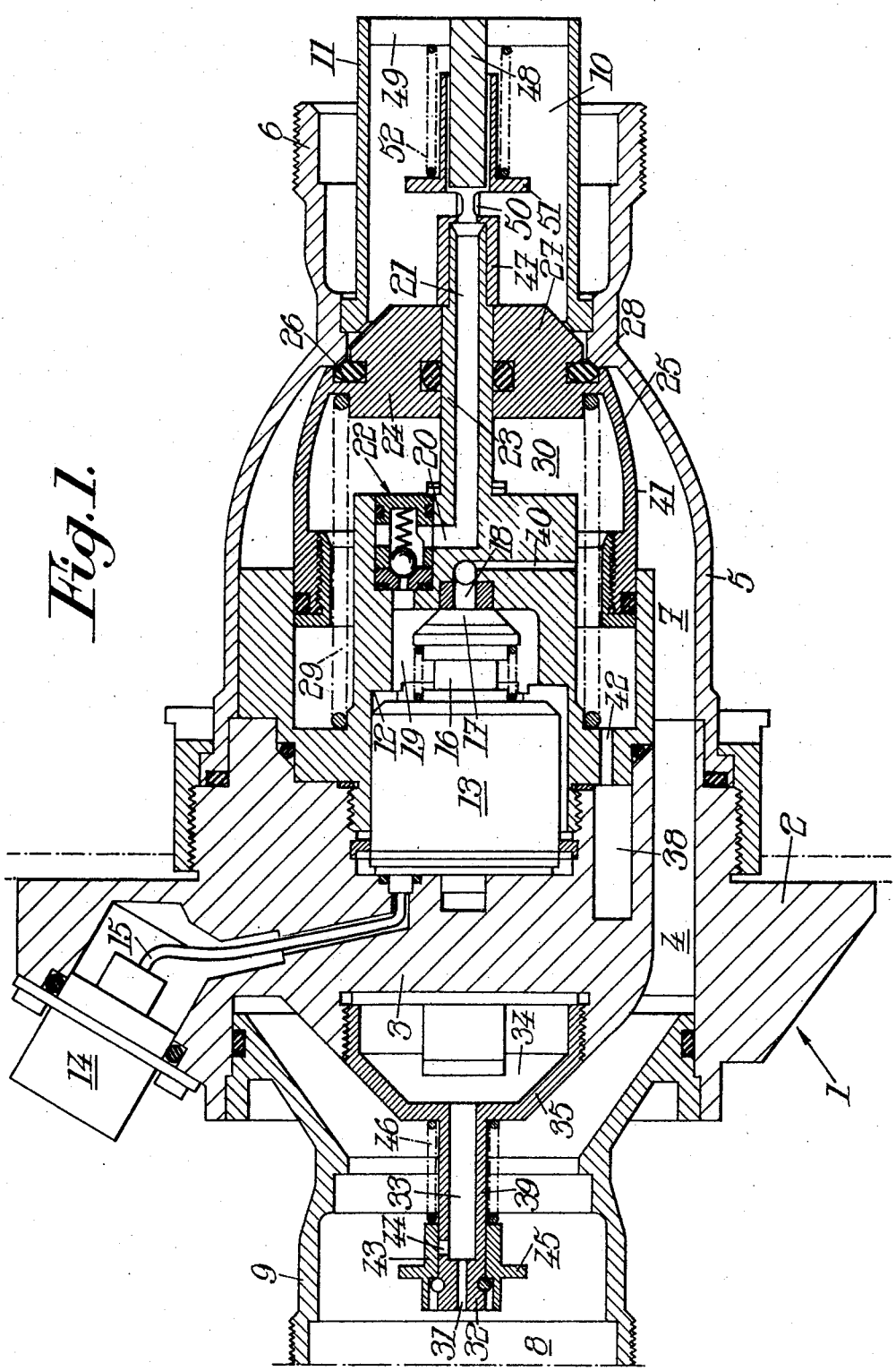
FIG. 1 is a view of a filling valve according to the invention in axial section.
Figure 2:
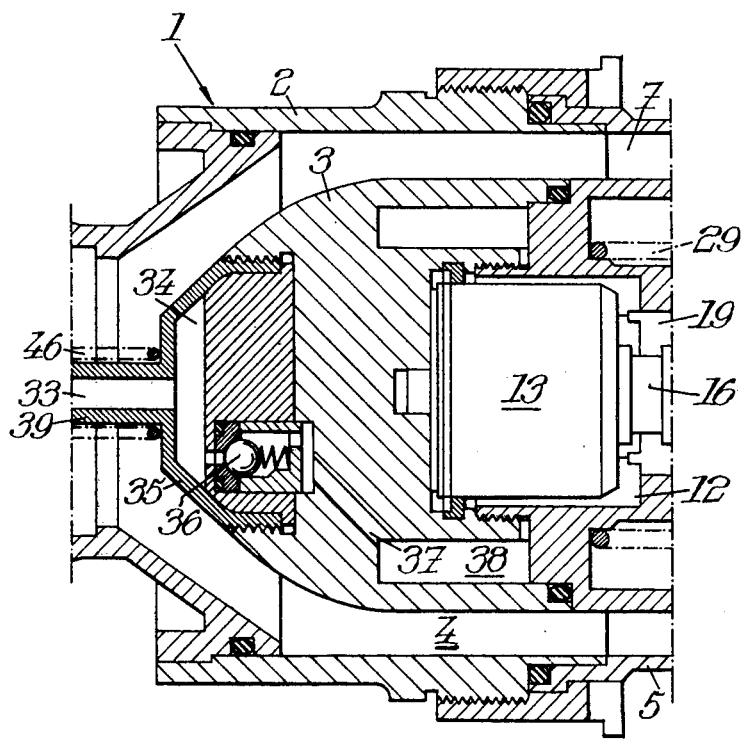
FIG. 2 is a partial view of the valve of FIG. 1 in axial section along a different plane.

Referring to FIGS. 1 and 2, there is shown a filling valve which comprises a valve body 1 comprising an outer casing 2 and a core 3 connected to casing 2 by ribs 4. Casing 2 and core 3 co-operate with an outlet spigot 5 connected to body 1 and terminating in a downstream connector 6 to bound an annular passage 7 through which fuel flows from the inlet orifice 8 of an upstream connector 9 mounted on the valve body 1. The fuel flows out through the outlet orifice 10 of a tube 11 mounted inside connector 6. Fuel circuit pipes are provided for junction with connectors 6 and 9.

Core 3 also has a recess 12 in which a solenoid 13 is mounted and can be electrically energized via a connector 14 and electric lines 15. Solenoid 13 actuates a plunger 16 carrying a valve member 17 adapted to close an orifice 18. Orifice 18 opens into a chamber 19 coaxial with recess 12 and communicates with ducts 20, 21 via a no-return valve 22. Duct 20 extends radially in core 3 and duct 21 extends axially in a cylindrical projection 23 of core 3. Duct 21 communicates with the outlet orifice 10 as will be described hereinafter.

A closure unit 24 is provided which comprises a piston or plunger 25 on which an O-ring seal 26 is retained by a spigot 27. The closure unit, when subjected to fluid pressure, forcibly applies seal 26 against a seat 28 formed on spigot 5, thus shutting off the annular passage 7 of outlet orifice 10. A spring 29 tends to apply the closure unit 24 against its seat 28.

Piston 25 and core 3 co-operate to bound an inner chamber 30 which is supplied with fuel at the upstream pressure via an orifice 31 formed in a metering member, a duct 33 and chamber 34 bounded by an outer casing 35, no-return valve 36 (FIG. 2), a duct 37 and an annular duct 38, ducts 37 and 38 both being formed in core 3. The duct 33 extends through a projecting cylindrical portion 39 of casing 35 and the metering member 32 is disposed in the free end of part 39. Chamber 30 can be connected to outlet orifice 10 via a transverse duct 40, orifice 18, chamber 19, no-return valve 22 and ducts 20 and 21. That part of the annular passage 7 which is adjacent the outer tapering surface 41 of piston 25 constitutes an "outer chamber" as hereinbefore referred to.

The device operates as follows. At rest, when there is no liquid pressure or electrical signal, the closure unit 24 is resiliently retained against its seat 28 by spring 29 and the filling valve is closed.

If the valve is now supplied with fuel under pressure via the upstream connector 9, the upstream pressure of the fuel in the annular passage 7 prevails on the outer surface 41 of piston 25, thus exerting on the closure unit 24 a force to the left which tends to open the valve; however at the same time the upstream pressure is admitted into chamber 30 via metering member 32, duct 33, chamber 34, no-return valve 36, duct 37, annular duct 38, and a duct 42 connecting duct 38 to chamber 30. The pressure in chamber 30 acts in the opposite direction to the pressure on surface 41 and, in conjunction with the force of spring 29, keeps the valve closed (as shown in FIG. 1).

If solenoid 13 is energized by passing an electric current via the terminals of connector 14, plunger 16 is moved, orifice 18 is opened by valve member 17 and chamber 30 is connected to the outlet orifice 10. Since chamber 30 is supplied by a metering member 32 only, the pressure therein drops and the pressure force on the outer surface 41 of piston 25 overcomes the pressure in the opposite direction, thus moving the unit 24 to the left and opening the filling valve.

In a first aspect of the invention (FIG. 1), the valve comprises the aforementioned elements and a sleeve 43 carried by the cylindrical part 39 of the outer casing 35 for sliding movement thereon. Rightward movement of the sleeve uncovers apertures 44 formed in the cylindrical portion 39 and communicating with duct 33. Sleeve 43 has a flange 45 or driving surface disposed transversely with respect to the direction of fuel flow, so that the fuel flowing through the valve tends to push it towards the right (in the drawings). Sleeve 43 is biased to the left by resilient means such as a spring 46.

If the flow rate increases, sleeve 43 moves to the right in FIG. 1 and 2, thus progressively uncovering the apertures 44, whose flow cross-sections are added to that of orifice 31 of metering unit 32. Consequently, chamber 30 is supplied with fuel which has been subjected to a lower head loss, thus increasing the pressure in chamber 30 and urging the closure member 24 in its closing direction and reducing the flow-rate.

According to another aspect of the invention (which may however be used in combination with the first), the filling valve comprises a sleeve 47 (FIG. 1) which can slide along the end portion of the cylindrical projection 23 of core 3 while being guided by a core 48 connected to stationary tube 11 by transverse ribs 49. Sleeve 47 has apertures 50 which, depending on its longitudinal position, are closed to a varying extent by core 48, and which permanently communicate with duct 21. Sleeve 47 has a flange 51 or driving surface disposed transversely with respect to the fuel flow direction so that the fuel travelling through the valve tends to push it towards the right (in FIGS. 1–2). Sleeve 47 is biased to the left by resilient means such as a spring 52 bearing on radial ribs 49.

If the flow rate increases, sleeve 47 moves to the right (FIGS. 1 and 2) and progressively closes apertures 50, thereby increasing the pressure in chamber 30 and moving the closure member 24 in its closing direction, and reducing the flow rate.

The aforementioned two aspects can be used either separately or in combination, as shown in FIGS. 1 and 2.

Another embodiment of the invention is shown in FIG. 3. All the elements similar to those in the preceding embodiment are denoted by the same references and will not be described again. Similar but modified elements are denoted by the same references followed by the letter a. In FIG. 3, the inner chamber 30 communicates with the upstream connection 2 by an orifice 31a terminating in a duct 33a through a projection 39a of a casing 35a; duct 33a terminates, via a no-return valve 36a, in a chamber 38a connected via a duct 42a to chamber 30; the outlet pipe 40, 18, 19, 20, 21 in the preceding embodiments is here denoted by 53 and its control means are not shown.

The embodiment in FIG. 3 comprises a movable closure unit 54 provided downstream with a flange 55 or driving surface disposed transversely with respect to the flow of fuel and provided upstream with a driving surface 56 for producing a variable pressure drop in the annular passage 7, thus reducing the pressure exerted on the outer surface 41 of piston 25 of closure unit 24 and thus tending to close means 24 and reducing the flow rate. The member 54 can be disposed in the upstream connector 9 or in the annular passage 7 and is also acted upon by resilient means such as a spring 57 which biases it towards the left in FIG. 3.

In addition to the above mentioned advantages of the invention, it should be noted that different tanks can be provided with filling valves adjusted to suitable flow rates for each tank, thus ensuring that all the tanks are filled up at the same time and reducing to a minimum the total filling time for a multi-tank vehicle, e.g. most jet transport aircraft.

The invention is in no way limited to those applications or those embodiments of its different parts which have been considered in detail, but includes all equivalents.

We claim:

1. A filling valve for a pressure refueling device comprising: a hollow body; an annular passage in said body between upstream connection means and downstream connection means; a movable closure unit co-operating with a seat in said passage; means in said body for axially guiding said closure unit and co-operating with said closure unit for limiting an outer chamber forming part of the annular passage and an inner chamber communicating with the upstream connection means; control means for opening and closing communication of said inner chamber and a discharge duct; the pressure of the fuel acting on that surface of the closure unit which limits the outer chamber tending to move the closure member away from its seat, and the pressure of the fuel acting on that surface of the closure unit which limits the inner chamber tending to move the closure unit into its seat, and the resulting force exerted on the closure unit in the opening direction being greater than the force exerted in the closing direction when communication with the discharge duct is fully opened by the control means and conversely when communication with the discharge duct is fully closed by the control means; and means responsive to the flow rate of fuel across the valve for increasing the ratio between the fuel pressure in the inner chamber and the fuel pressure in the outer chamber as the flow rate increases, said means responsive to the flow rate of fuel including a movable sleeve guided in said body parallel to the flow direction of fuel in the body, said sleeve being provided with a driving surface disposed transversely with respect to the fuel flow direction and being constructed so as to increase the cross-section through which the upstream connection means communicates with the inner chamber, in proportion as the flow rate increases, and resilient means acting on said sleeve in the direction opposite to the flow direction.

2. A filling valve for a pressure refueling device comprising: a hollow body; an annular passage in said body between upstream connection means and downstream connection means; a movable closure unit co-operating with a seat in said passage; means in said body for axially guiding said closure unit and co-operating with said closure unit for limiting an outer chamber forming part of the annular passage and an inner chamber communicating with the upstream connection means; control means for opening and closing communication of said inner chamber and a discharge duct; the pressure of the fuel acting on that surface of the closure unit which limits the outer chamber tending to move the closure member away from its seat, and the pressure of the fuel acting on that surface of the closure unit which limits the inner chamber tending to move the closure unit into its seat, and the resulting force exerted on the closure unit in the opening direction being greater than the force exerted in the closing direction when communication with the discharge duct is fully opened by the control means and conversely when communication with the discharge duct is fully closed by the control means; and means responsive to the flow rate of fuel across the valve for increasing the ratio between the fuel pressure in the inner chamber and the fuel pressure in the outer chamber as the flow rate increases, wherein said inner chamber communicates with said upstream connection means through port means having a cross-sectional flow area which is controlled by said flow rate responsive means and with said downstream connection means through said control means and said discharge duct.

3. A filling valve according to claim 2, having flow constriction means interposed in said discharge duct, the flow cross-sectional area of said constriction means being controlled by another flow rate responsive means which decrease said cross-sectional area in proportion as the flow rate increases.

4. A filling valve according to claim 2, having resilient return means permanently biasing said closure unit toward its seat.

* * * * *